(12) United States Patent
Haffey et al.

(10) Patent No.: US 6,396,962 B1
(45) Date of Patent: *May 28, 2002

(54) SYSTEM AND METHOD FOR PROVIDING ZOOMING VIDEO

(75) Inventors: Samuel F. Haffey; Jad Nehme; Kathleen Cunningham, all of New York, NY (US)

(73) Assignees: Sony Corporation (JP); Sony Electronics Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,652

(22) Filed: Jan. 29, 1999

(51) Int. Cl.[7] ............................................... G06K 9/48
(52) U.S. Cl. ..................... 382/298; 382/299; 382/295; 345/660; 345/661; 348/561
(58) Field of Search ................ 382/298, 299, 382/295, 293, 282, 255, 256; 345/611, 613, 619, 622, 660, 661, 666, 667; 348/240, 561, 581

(56) References Cited

U.S. PATENT DOCUMENTS

| 4,792,856 | A | * | 12/1988 | Shiratsuchi ................. 358/180 |
|---|---|---|---|---|
| 5,341,466 | A | | 8/1994 | Perlin et al. |
| 5,596,346 | A | | 1/1997 | Leone et al. |
| 5,596,690 | A | | 1/1997 | Stone et al. |
| 5,615,384 | A | | 3/1997 | Allard et al. |
| 5,617,114 | A | | 4/1997 | Bier et al. |
| 5,732,230 | A | | 3/1998 | Cullen et al. |
| 5,793,379 | A | * | 8/1998 | Lapidous ..................... 345/439 |
| 5,812,144 | A | * | 9/1998 | Potu et al. .................. 345/439 |
| 5,838,296 | A | * | 11/1998 | Butler et al. ................ 345/127 |
| 6,034,661 | A | * | 3/2000 | Servan-Scheiber et al. . 345/127 |

* cited by examiner

Primary Examiner—Bhavesh Mehta
Assistant Examiner—Yosef Kassa
(74) Attorney, Agent, or Firm—Lerner, David, Littenberg, Krumholz & Mentlik, LLP

(57) ABSTRACT

A method for transforming a video file provided to a computer into an object in a zooming universe established in such computer, which zooming object may be enlarged and panned by manipulation by a user via a computer input device. At the time a video file is opened in a video player library on such a computer, a zooming engine is enabled on the computer and a zooming universe is enabled therefrom. Frames of the video file being played on the computer video player library are copied to a video object in the zooming universe and displayed there. By manipulation of the parameters of the bounding box enclosing the zooming video object, through use of a computer input device, the user is able to scale and pan the video image in the zooming universe display up (or down) to a desired viewing size and perspective.

20 Claims, 8 Drawing Sheets

SYSTEM AND METHOD FOR PROVIDING ZOOMING VIDEO

CROSS REFERENCE TO RELATED APPLICATIONS

This application is related to U.S. patent application Ser. No. 09/211,666 entitled "Polymorphic Event Handling for Zooming Graphical User Interface," filed Dec. 14, 1998; U.S. patent application Ser. No. 09/211,280, entitled "Interchangeable Pick Handler for Zooming Graphical User Interface," filed Dec. 14, 1998; U.S. patent application Ser. No. 09/211,669, entitled "Object Oriented Zooming Graphical User Interface," filed Dec. 14, 1998; U.S. patent application Ser. No. 09/223,934, entitled "Click-Through Pick Method For Group Objects In A Zooming Graphical Interface," filed Dec. 31, 1998; U.S. patent application Ser. No. 09/240,905, entitled "Zooming Information Space Grid For Graphical User Interface," filed Jan. 29, 1999; U.S. patent application Ser. No. 09/240,905, entitled "Singleton/Universe Based Zooming Space For Graphical User Interface," filed Jan. 29, 1999; and U.S. patent application Ser. No. 09/245,205, entitled "Apparatus and Method For Cropping An Image In A Zooming Graphical User Interface," filed, Feb. 5, 1999. All of the referenced patent applications are assigned to Sony Corporation of America, the assignee herein, and are incorporated herein by reference.

FIELD OF INVENTION

The present invention relates generally to the field of image display methods and apparatus and more particularly to the application of image zooming technologies to video display.

BACKGROUND OF INVENTION

With the substantial increase in processing power for personal computers realized in the recent past, it has become possible for such computers to generate and display very complex graphical images. Concomitantly, the development of efficient algorithms for compression of video signals has made possible digitizing of a video stream into a computer file which can be transmitted over relatively limited bandwidth transmission paths and displayed as a graphical image on such a computer. However, due to both transmission path and processor limitations, the display of the video image at the computer is typically restricted to a small portion of the available display area—e.g., an area of 240×160 pixels. It would often be desirable from a user's perspective to be able to view the received video image at a larger size. While a limited re-sizing capability is known in the present art, it does not provide a smooth transition from one size to another, and does not permit a concurrent panning and re-sizing of the image.

SUMMARY OF INVENTION

A method is provided for transforming a video file provided to a computer into an object in a zooming universe established in such computer, which zooming object may be enlarged and panned by manipulation by a user via a computer input device. In particular, a video file is opened in a known video player library on such a computer. At the same time a zooming engine is enabled on the computer and a zooming universe is enabled therefrom. Frames of the video file being played on the computer video player library are copied to a video object in the zooming universe and displayed there. By manipulation of the parameters of the bounding box enclosing the zooming video object, through use of a computer input device, the user is able to scale and pan the video image in the zooming universe display up (or down) to a desired viewing size and perspective.

In a further embodiment of the invention, a method is provided in the zooming universe for providing a scaling of the video image according to user direction without also scaling text or other material external to the video but overlaying the video image. According to that embodiment, the video image object in the zooming universe is periodically "damaged" to cause the "paint" program operating to display the image to repaint the image. Such periodic damaging of the video object will occur at a repetition rate sufficient to cause a viewer to perceive the video image as continuous.

BRIEF DESCRIPTION OF THE DRAWINGS

A better understanding of the present invention, and additional objects, features and advantages of the invention, will be apparent to those skilled in the art upon reference to the following detailed description in conjunction with the accompanying drawings, in which.

DETAILED DESCRIPTION

Video files for running on a computer are available in a variety of encoding formats, among the more popular being "AVI", "Quick Time" and "MPEG," all of which are well known to those skilled in the art. In order to play such a video file in a computer, special software is required, such as RealVideo from Real Networks, Inc. or DirectShow from Microsoft, Inc. In the illustrative embodiment of the invention described hereafter, it is generally assumed that the native video player library is DirectShow, which is a component of the Microsoft DirectX family of graphical applications. It should, however, be apparent to those skilled in the art that the methodology of the invention is not limited to operation with any particular native video player library.

A zooming video interface according to the method of the invention is able to display selected video objects at multiple levels of magnification. The zooming video interface constructs graphic representations of the video (and other) objects from stored information, which representations the user is able to magnify, reduce and pan. Magnification, also know as "zooming in," displays an object or group of objects in greater size and/or detail. Reduction, also know as "zooming out", displays an object or group of objects in smaller size and/or less detail.

In a preferred embodiment, the instructions implementing the zooming video interface of the invention are coded in JAVA®. Of course, other embodiments may be implemented using any platform independent language, such as PERL™, or any platform dependent language, such as C++ or Fortran.

Prior to discussing in detail the zooming video methodology of the invention, it is desirable to briefly discuss the computer environment in which the invention operates, as well as the zooming engine which provides the fundamental infrastructure for the operation of that methodology.

Computer Architecture

Figure 1:
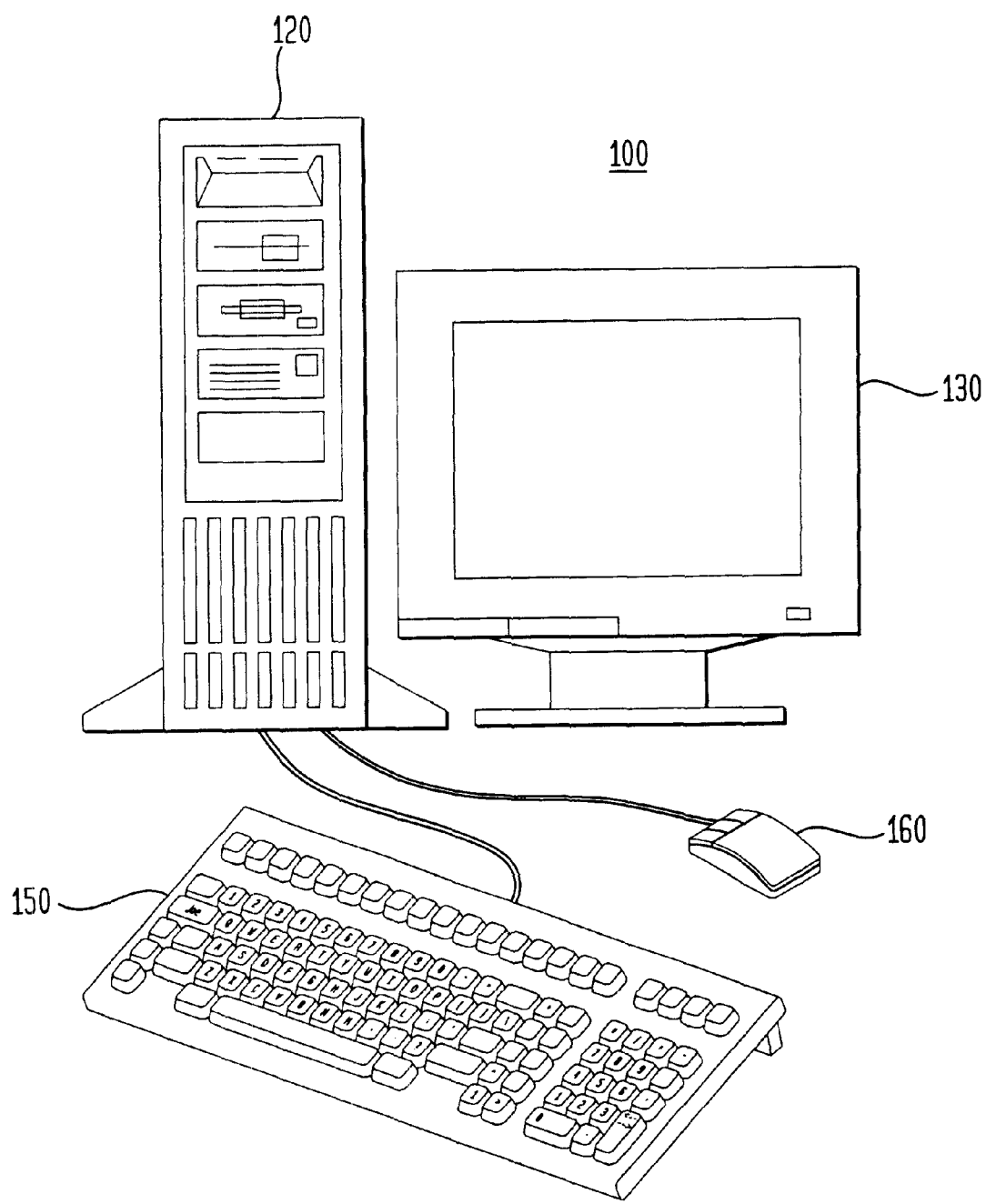
FIG. 1 is a schematic diagram illustrating a conventional computer system.

FIG. 1 illustrates an exemplary computer system 100 which is adaptable for implementing the zooming video interface system according to the invention. The computer system 100 includes a main housing 120 connected to a monitor 130 and interactive input devices, in this example a keyboard 150 and mouse 160, which include switches 155 and 165 having positive on and positive off positions for generating signals to the system 100. The main housing 120 includes various items (not shown in FIG. 1) that are typically used in a computer system 100. By way of example, these elements may be a processor, ROM and RAM memory, cache memory, a hard disk storage device, a floppy disk drive, a storage tape drive, graphics and audio cards, a network interface card, and a power supply, all interconnected using a conventional architecture.

A computer system 100 configured as such provides visual output through a monitor 130 and audio output through speakers (not shown), and receives input through a keyboard 150, mouse 160, and possibly a microphone (not shown). The user can interface with the computer system 100 in conventional fashion, such as by positioning the screen cursor on a desired object using an interactive input device, such as mouse 160, and clicking (depressing a button of) the interactive input device, such action providing input to the system and identifying/selecting the desired object for further activity. For example, the user may use the mouse 160 to move a cursor about a graphical display and position the cursor in relation to a particular image on the graphical display shown on the monitor 130. The user may then provide input to the system using the mouse 160 by a double click of a mouse switch 165 while the cursor so positioned, such action typically providing information to the system in respect to desired action related to the image. The display and functionality may be referred to as a graphical user interface.

Although the illustrated computer system 100 is of the desktop type, it is noted that the present invention is equally applicable to other computer system types, such as the lap-top type and palm type. Additionally, although the preferred embodiment implements a mouse for moving a cursor and providing input, it is noted that various technologies for accepting input and displaying output will evolve, and that such evolving technologies are contemplated by the present invention. For example, instead of mouse and keyboard commands, audio commands may ultimately be used to update the display. These and other alternatives will be recognized by the ordinarily skilled artisan.

Figure 2:
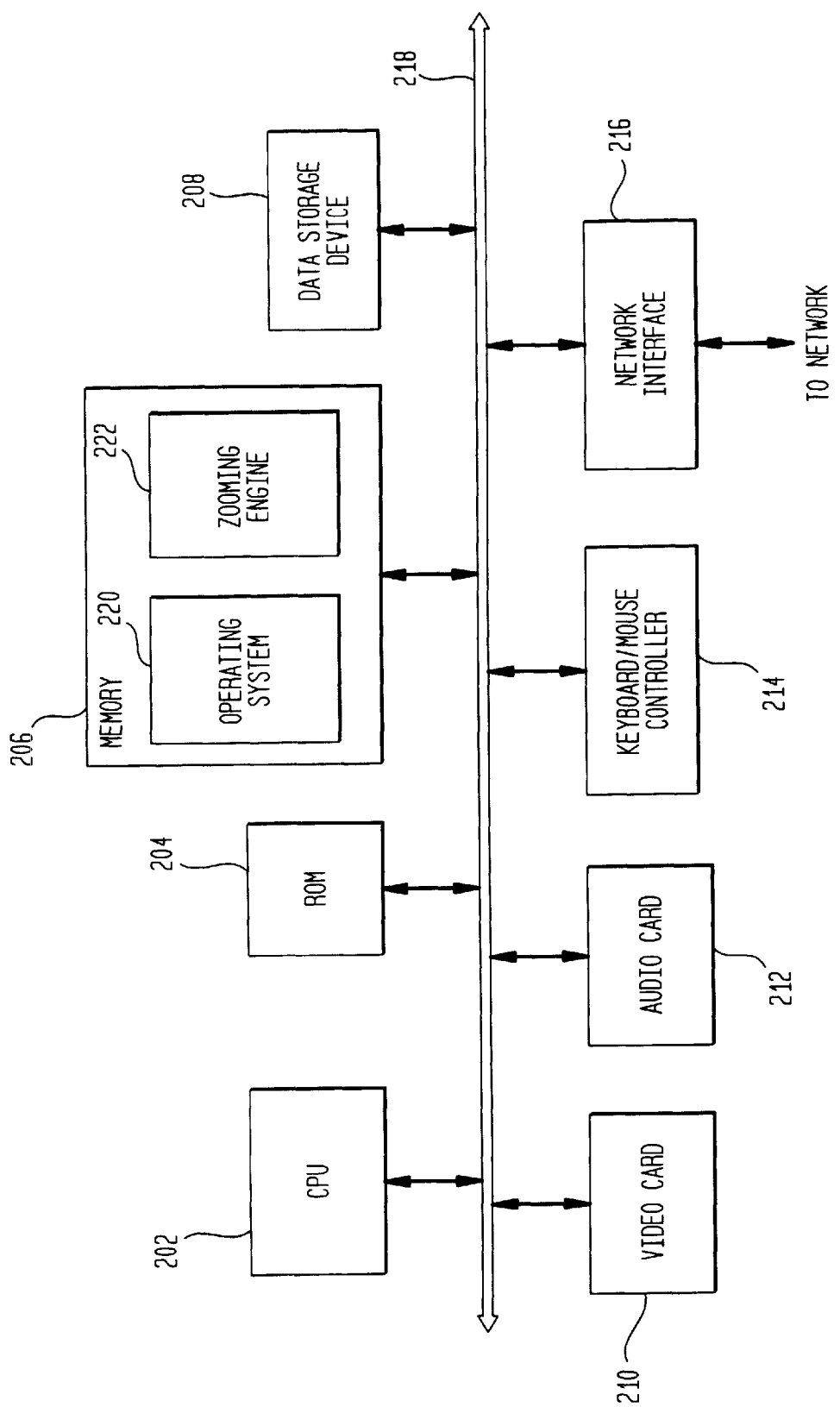
FIG. 2 is a block diagram illustrating a computer system having an embodiment of a zooming engine in accordance with the present invention.

The block diagram of FIG. 2 illustrates an embodiment of a computer 200 (the portion of the system 100 typically found in the main housing 120) that includes a CPU 202, ROM 204, memory 206, data storage device 208, video card 210, audio card 212, keyboard/mouse controller 214, and network interface 216, each coupled to a bus 218 in conventional fashion. The CPU 202 is a conventional processor, such as the PENTIUM® type provided by Intel Corporation of Santa Clara, Calif. The CPU 202 executes instructions, such as those provided in ROM 204 and/or memory 206. ROM 204 is a read only memory, which retains its stored information even while it is disconnected from a power supply. The ROM 204 may, for example, store instructions for a boot up sequence. Memory 206 is preferably volatile memory for storing instructions and information used during ordinary operation, such as those provided in the computer operating system. The data storage device 208 provides long term data storage, and is preferably a magnetic or magneto-optic hard disk device. The video card 210 and audio card 212 respectively provide the interface between the computer 200 and the monitor and speakers. The keyboard mouse controller 214 interfaces the computer 200 and the keyboard and mouse that are used to provide input to the computer 200. The network interface 216 is a conventional network interface card that interfaces a local network line and the computer 200. The network interface card may be a conventional ethernet card, or may be a multipurpose interface for communication over a ethernet, ISDN and/or other networks. Access to the Internet can be provided through the network interface 216.

It is noted that a computer 200 may include different items than those noted in the described embodiment. For example, I/O ports for interfacing with printers and plotters, a floppy disk drive, a CD ROM drive, and various other features may be included, and various elements may be excluded. Also, although Internet access is described in connection with a network interface card, a modem connected to a conventional phone line can be used to access the Internet, such as through an internet service provider. The ordinarily skilled artisan will recognize the various alternatives for the computer 200.

Still referring to FIG. 2, the memory 206 also will include an operating system 220 and a zooming engine 222. The operating system 220 is a program that is typically loaded from the long term data storage device 208 (e.g., hard disk) to the main memory 206 during a boot up sequence. The operating system 220 manages the other programs in the computer, which are referred to as applications, and includes particular instructions and operations that can be used by the applications, either directly or through an application program interface. The operating system 220 also handles exchanges to and from devices connected to the computer (e.g., printers, disk drives, etc.), manages memory use, and allocates computing resources in multitasking environments.

The zooming engine 222, which will be described with more particularity below, includes instructions for updating the display 130 according to user and system input. For example, the zooming engine 222 manages the various zooming objects that may be provided in a zooming space, determines the available display space, determines which zooming objects are visible in the available view space, and responds to various events to update the display, such as mouse and keyboard events which arise in response to the user's navigation of the zooming space. Preferably, the zooming engine 222 is provided as software, although all or part of the zooming engine 222 may be provided as hardware, firmware, or a combination of software, hardware and firmware.

In the preferred embodiment, the system 100 utilizes a known computer operating system, such as UNIX®, WINDOWS95® or WINDOWS98®, found resident in area 220 of memory 206. When implemented as a set of instructions for a computer processor, the zooming engine used by the invention is written in the JAVA® programming language, and the instructions, including the JAVA® virtual machine, can be found resident in area 220 in the memory 206 of the system 100. The JAVA® virtual machine, an abstract specification for a computing device, operates as an interface between the JAVA® application and the specific computer platform (e.g. Intel, Apple) on which the application is to be run. As is known in the art, JAVA® is a platform independent, object oriented programming language, the details of which are fully described by Sun Micro Systems, Inc. at its Internet website. The Sun Micro Systems website on the World Wide Web (WWW) can be located using its Uniform Resource Locator (LTRL), www.java.sun.com, and descriptive documentation concerning JAVA®, the JAVA® Development Kit and related products may be obtained at this website.

Alternatively, the system may include hardware and software operable to permit communication with the World Wide Web or with a local network. In that case, the software would include a JAVA® enabled browser, such as Netscape Navigator™. This enables the system 100 to run the instruction set received through the network interface 216 from a website where the platform independent language instruction set resides.

Zooming Engine

Figure 3:
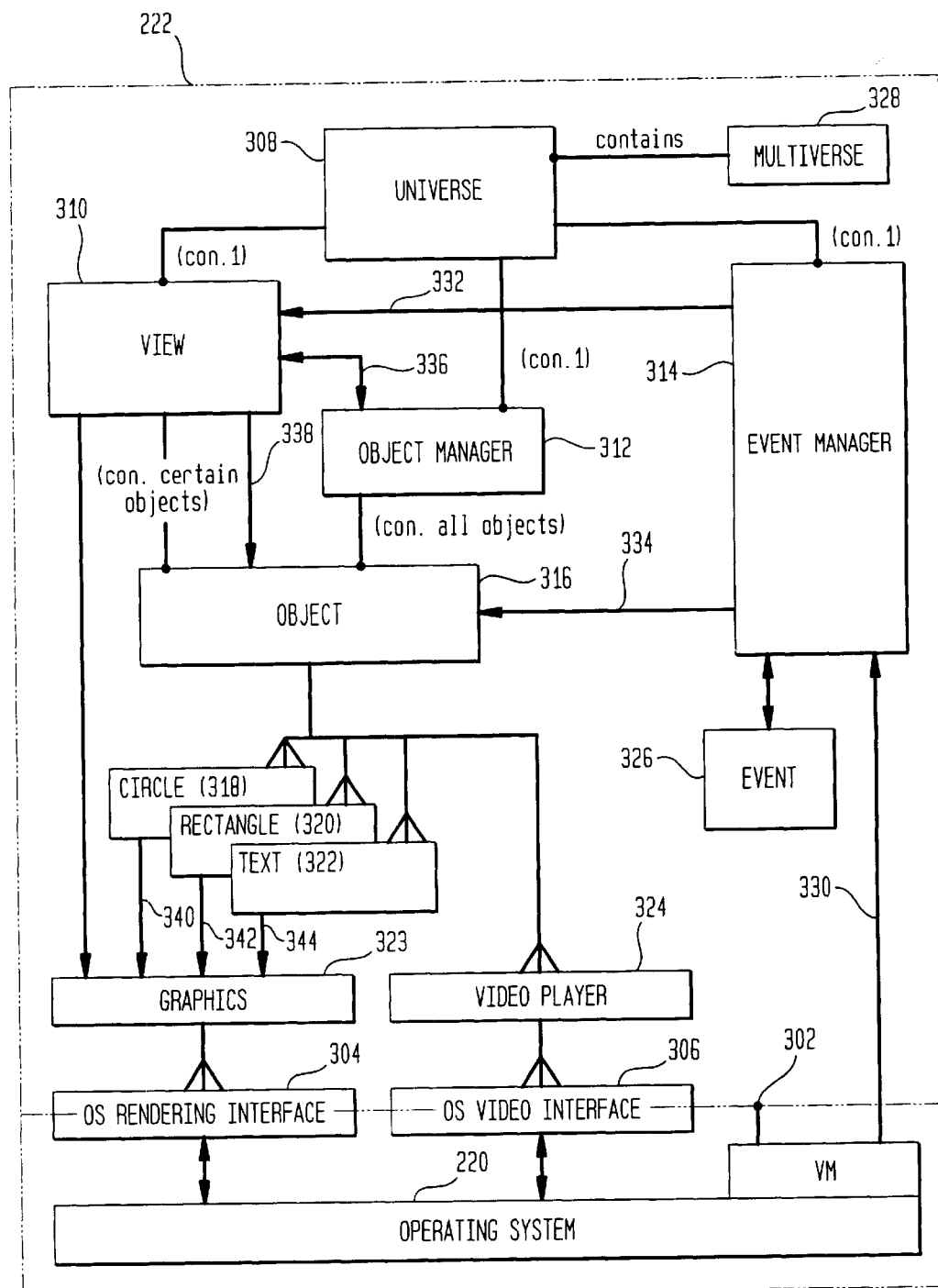
FIG. 3 is a block diagram illustrating an embodiment of a zooming engine in accordance with the present invention.

The block diagram of FIG. 3 illustrates an embodiment of a zooming engine 222 architecture for facilitating zooming video interface functionalities such as those contemplated by the method of the invention. Preferably, the zooming engine 222 operates with an operating system 220, as described above, and includes various instructions which are executed by a CPU for providing the zooming graphical user interface functionality.

Additionally, although the zooming engine 222 may operate in any environment which facilitates the execution of instructions, including platform dependent ones, the preferred zooming engine 222 embodiment is generally platform independent, running on a virtual machine 302. The preferred zooming engine embodiment is implemented in the Java programming language and the virtual machine (VM) 302 is a Java VM. Interfaces 304 and 306 between the zooming engine 222 and operating system 220 may also be provided, such as those for rendering graphics 304 and video 306 using the operating system 220. These interfaces 304, 306 may comprise conventional facilities for interfacing with the operating system 220 such as dynamic link library (DLL) files, and/or the Microsoft DirectDraw and DirectShow SDK for the WINDOWS environment.

The zooming engine 222 includes a universe module 308 which is the highest level module corresponding to a given zooming space. The universe module 308 contains a view module 310, an object manager module 312, and an event manager module 314. These modules 308–314 include instructions which, when executed, perform the various functions described in connection with them. Although the modules 308–314 (as well as the additional sub-modules directly or indirectly associated with them) will likely be provided as software, their functionality may also be produced by using hardware or firmware. Preferably, the modules 308–314 are implemented using Java singleton class definitions which allow for only one instance of a class to be created per universe.

The illustrated universe module 308 and all of its sub-modules pertain to a single zooming space. Multiple instances of zooming spaces may be provided, as the multiverse 328 may contain numerous zooming spaces which would each comprise its own universe module 308 and appropriate sub-modules. Such a multiverse facility is described further in the above referenced application Ser. No. 09/240,905, entitled "Singleton/ Universe Based Zooming Space for Graphical User Interfaces."

The object manager module 312 controls all of the objects in the zooming space, which zooming objects are defined by the zooming object module 316, including its subclasses, such as circle module 318, rectangle module 320, text module 322, and video player module 324. The branches, such as those shown between the zooming object module 316 and the subclasses 318–324, indicate a one-to-many relationship. For example, there may be more than one circle module 318, with each module 318 inheriting the characteristics of the superclass zooming object module 316.

The zooming engine 222 may interface with various operating systems 220. Where this is the case, the graphics module 323 interfaces the zooming engine 222 to the appropriate OS rendering interface 304. Similarly, there may be various different video player modules 324, which in turn may be ported to various operating system interfaces.

The event manager module 314 produces event objects 326 responsive to system events (arrow 330) such as mouse and keyboard events initiated by the user. The event objects 326 are then passed, along with event handling information, to the view module 310 (arrow 332) and/or the zooming object module 316 (arrow 334) so that the display can be appropriately updated.

The view module 310 contains at least one set of zooming objects selected from those in the zooming space, through request and receipt arrow (336) of information about the zooming objects from the object manager 312. Typically, the view module 310 contains those zooming objects which reside in the main zooming view. They may be associated to the same index used by the object manager 312. This allows the various objects in a view to be separately organized in the view module 310, so that separate calls to the zooming object module 316 are not required. For example, the view module 310 can issue commands (arrow 338) which are propagated through the object module 316 and any relevant subclass modules to affect rendering of many zooming objects contained in the main zooming view.

Individual or groups of zooming objects may be separately targeted for update responsive to event information passed directly to the zooming object module 316 by the event manager 314, and rendering commands would be more directly issued by the objects, such as is depicted by arrows 340-344. An example of such an update could be responsive to user selection and manipulation of a single object.

Zooming Space

Figure 4:
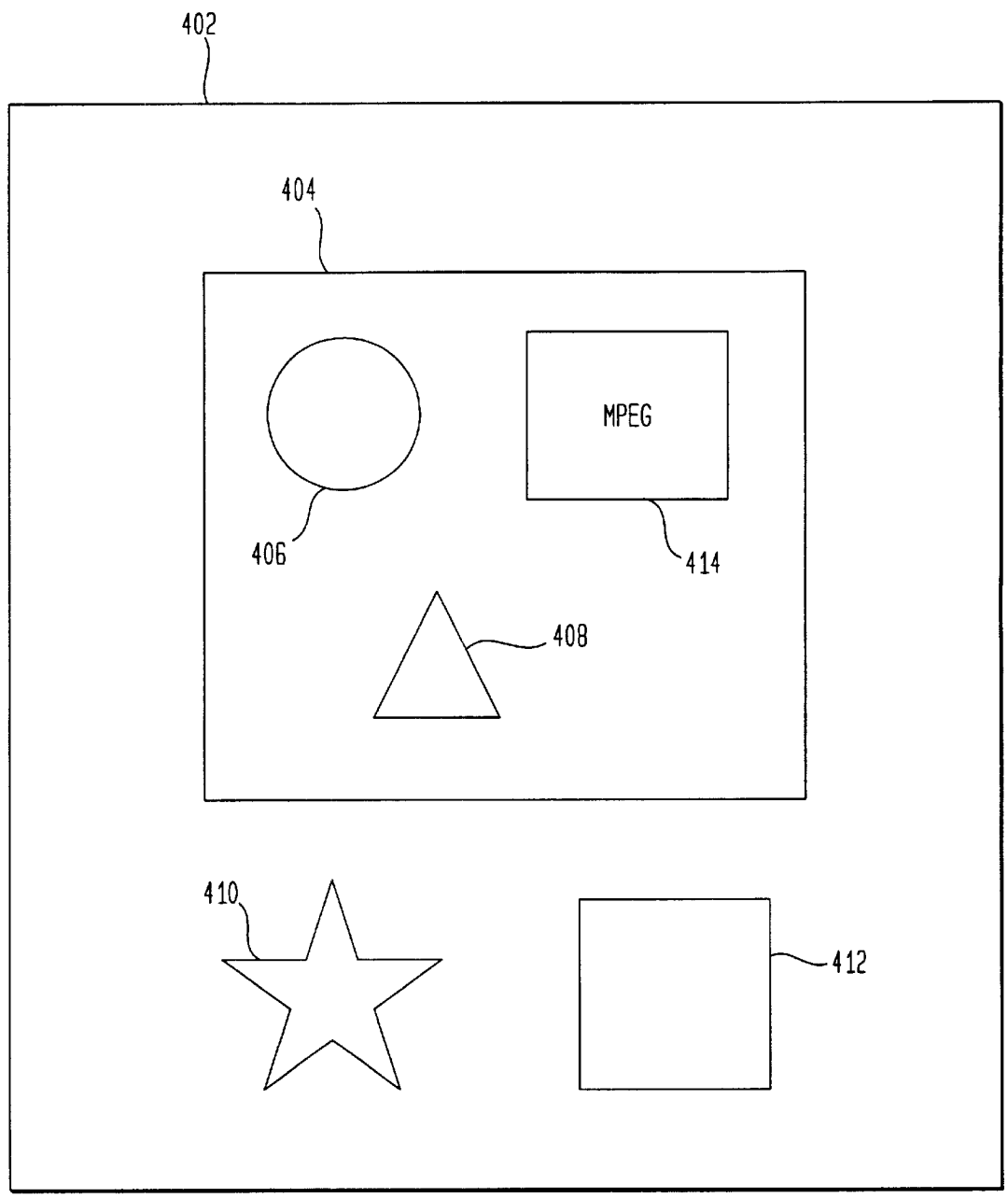
FIG. 4 is a schematic diagram illustrating various zooming display objects, including a zooming video object, in a zooming space in accordance with the interface of the present invention.

FIG. 4 is a schematic diagram illustrating various geometric objects representing information contained in a zooming space 402, including zooming objects 406, 408, 410, 412 and 414. The outer boundaries of the figure, 402, represent the zooming space. While the edges of the zooming space 402 are shown for ease of illustration, they may not necessarily be part of the zooming space. Included in the zooming space 402 is an available view space 404. Typically, the available view space 404 is dictated by the display device 130 and its configuration. Thus, the available view space 404 may be the maximum display area for the display device 130. Additionally, in an environment where the zooming engine 222 works in conjunction with an operating system 220, the available view space may be related to features provided by the operating system 220. For example, the usable display area for an open window in a WINDOWS operating system 220 may be the available view space 404. Thus, the available view space 404 can change by using conventional controls for maximizing the window, or altering the locations of the sides of the window.

Objects available for zooming in zooming space 402 include a circle 406, triangle 408, star 410, a square 412 and a an MPEG video image 414, such objects being graphical objects having particular sizes, shapes and colors. Video objects may comprise standard video formats including MPEG, AVI, Streaming Video, etc. The above listed zooming objects and object formats are for illustrative purposes and are by no means exhaustive. The ordinarily skilled artisan will recognize the various alternatives objects and object formats that can be readily substituted for those listed.

The zooming space 402 includes all of the zooming objects 406–414 that may be viewed by the user during navigation of the zooming space 402. However, all of the zooming objects 406–414 might not be visible at a given time, since the available view space 404 may not be large enough to encompass the entire zooming space 402. For example, here the available view space 404 covers the triangle 408, the circle 406 and the MPEG video object 414, but other objects may come into or out of view based on the scale of objects in view and the panned location.

In the zooming space, users are able to interact directly with graphical objects by selecting an object with a mouse. This action produces an event in the zooming engine, initiating an intersection test on each visible object in the universe. Primitive objects, such as lines, rectangles or ellipses, perform a simple mathematical test to check if the point under the mouse cursor intersects the object's geometry. If an object, as defined by its bounding box, is intersected by the point under the mouse cursor, the user is able to perform additional operations on the intersected object. Since the zooming object class has no geometry of its own, a variety of shaped bounding boxes can be chosen to determine whether an intersection between the bounding box and a point under the mouse cursor has occurred, although the preferred bounding box is a rectangle.

The user can navigate the zooming space 402 in three dimensions. Generally, movement in the X and Y directions, corresponding to the planar surface of the display device available view space an be referred to as panning, while navigation in the Z direction can be referred to as "zooming". Navigation in the Z direction (into or out of the display screen) causes the perspective of the available view space 404 to appear to zoom into or away from the zooming objects in the zooming space 402.

Navigation into the display screen (the +z direction) causes the zooming objects to appear to become closer to the viewer, and thus larger. This may be referred to as "zooming in." This also causes the perceived separation of the zooming objects to increase, which may cause a zooming object to leave the available view space 404. To "zoom in", the user marks information desired for viewing in greater detail with a cursor and operates the input device in a manner to cause the desired information to be magnified.

Navigation out of the display screen (the −z direction) causes the zooming objects to appear to become further away from the user, and thus smaller. This may be referred to as "zooming out." Of course, as the user zooms out, the perceived separation of the zooming objects decreases as well, and additional zooming objects may come into the available zooming space 404. To "zoom out", the user marks information desired for viewing in lesser detail with a cursor and the desired information is reduced in size, thereby displaying a larger portion of the chosen information. All zooming operations can be responsive to conventional interactive input commands. For example, depressing the left mouse key can cause a zoom in, and depressing the same button with the keyboard shift key depressed can cause a zoom out.

Figure 5A:
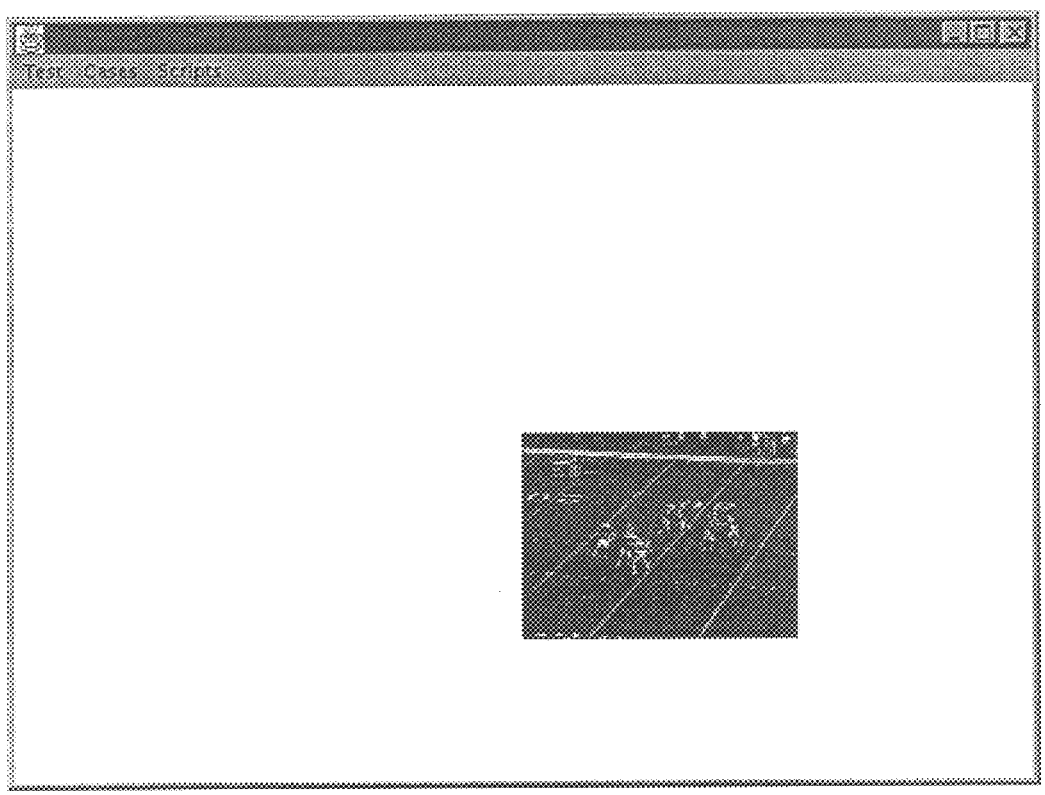
FIG. 5A, 5B and 5C provide an illustration of a video image as might be displayed without any scaling, and zoomed in and out according to the method of the invention.
Figure 5B:
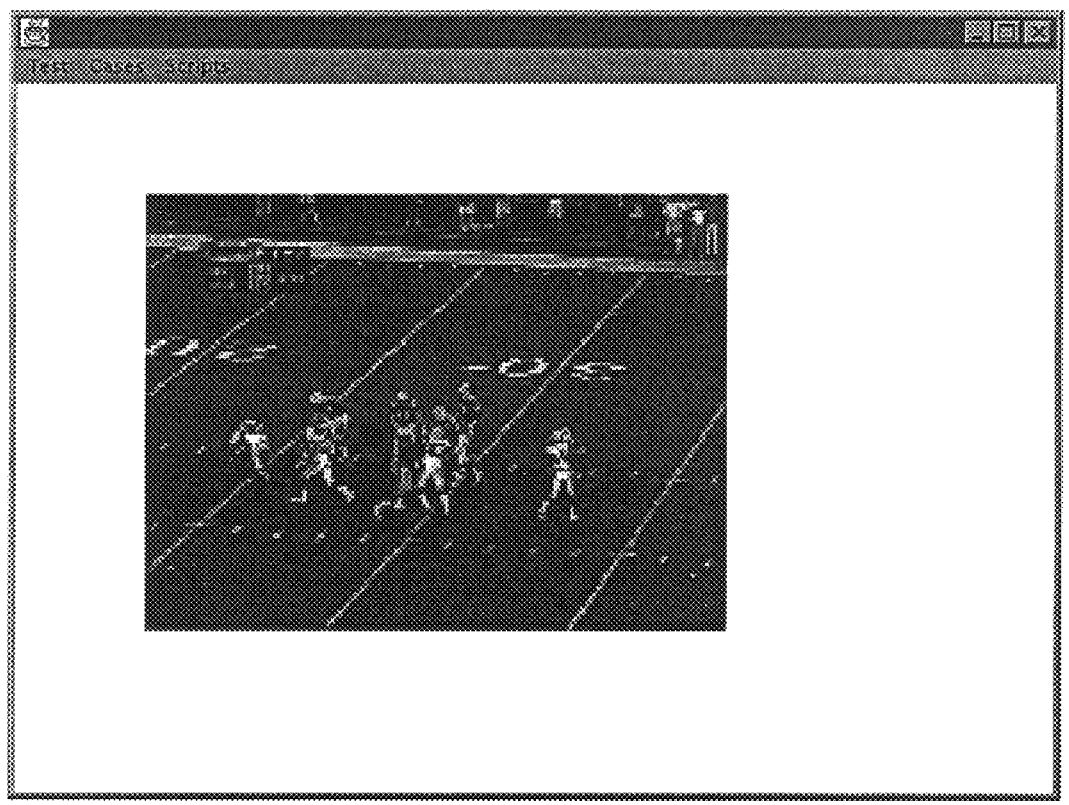
Figure 5C:
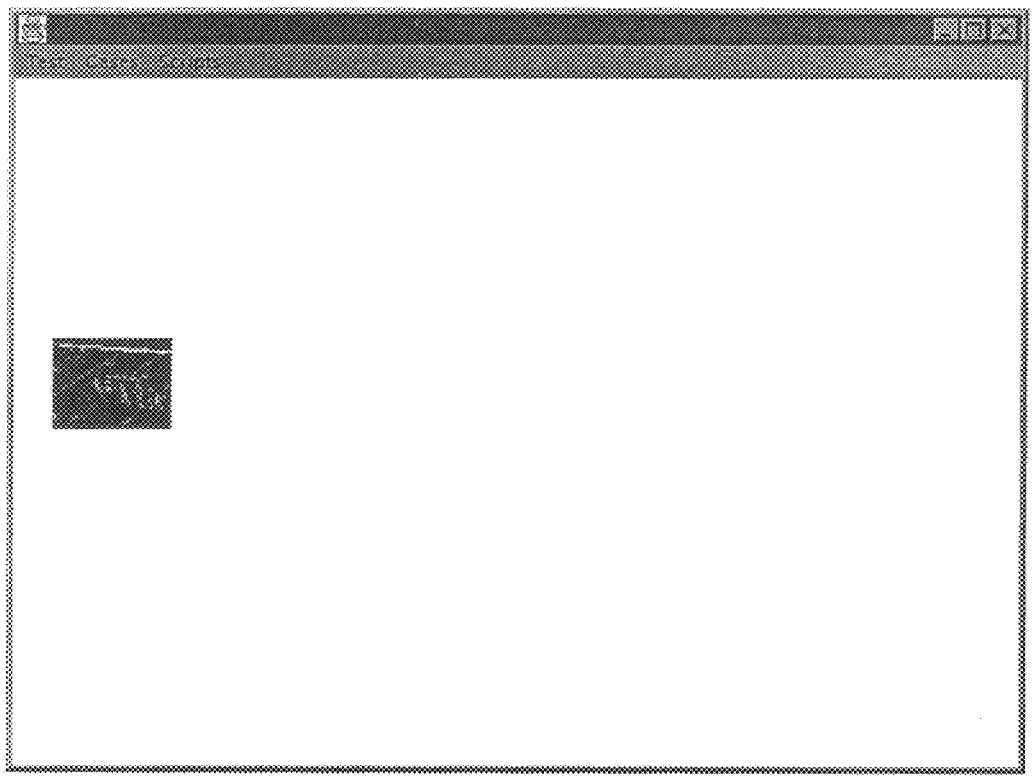

FIGS. 5A through 5C provide an illustration of a displayed image for a video being operated on according to the invention. Each of the illustrated images is a capture of a view on the same Zooming Universe. Zooming Video Image1, shown in FIG. 5A, displays what the user would see when opening a video file and directing it to play. In the illustrated case, the play command may be given by pulling down one of the menus at top left of image and selecting "play" from the menu. (Note that the detail of such a pull-down menu operation is not illustrated, but will be well understood by those skilled in the art.) Zooming Video Image2, shown in FIG. 5B, illustrates the same video image zoomed in a bit. Illustratively, the user executes the zoom-in function by placing the mouse cursor anywhere in the viewed image and pressing the left mouse button. Note that the location that is zoomed in is the location of the mouse cursor. Zooming Video Image3, shown in FIG. 5C, illustrates the same video image zoomed out. Illustratively, the user executes the zoom-out function by placing the mouse cursor anywhere in the viewed image and pressing the shift key and the left mouse button simultaneously.

Zooming Video Methodology

According to the methodology of the invention, a video player library is established in the native code of the computer operating system, and a selected video file is opened in that video player library. A zooming engine, which is preferably established in the JAVA programming language, will also have been initiated in the computer, and a zooming universe for such zooming engine is caused to be displayed at the display device for the computer (or in the active window for such display). For a preferred embodiment, the video player library will be Microsoft DirectShow, and the video file frames will be stored in a memory area known, in the Microsoft DirectX vernacular, as a DirectDraw surface.

In the JAVA-based zooming engine, a thread is created which descends into the native code for the video player software when the zooming video object is instructed to play, through the OS Video Interface 424 of the zooming engine, to create a capture loop in relation to the surface at which the video frames are being stored. In an illustrative embodiment, that loop is executed at the frame rate of the video stream, and each time through the loop, a video frame is copied to the surface on which the video frame is being stored. The copied video frames are then transformed to a video object in the zooming universe, that video object representing a surface in the zooming universe on which the video frames are displayed. By manipulation of the dimensions and position of a bounding box enclosing the video object in the zooming universe, using conventional computer input devices, the scale of that object may be enlarged so as to provide the user with a panned and magnified image of the running video file. It is noted that the copy rate for the capture loop is selected primarily from the perspective of providing a perception of continuous motion to the viewer's eye.

In a further embodiment of the invention, a method is provided to address the circumstance of a video object which is overlaid by another object, such as text. In many cases, the user will desire to zoom the scale of the video object without a corresponding zooming of the text object. Because the video object has to be constantly refreshed at a frame rate—e.g., 30 times per second, while the overlaid text is not refreshed, the methodology of this further embodiment creates a sort of animation that exists inside the zooming universe and "damages" the video object at that refresh rate. Such "damaging" of the video object is intended to connote an action which will cause the image to be repainted in the display. By so damaging the video object within the zooming universe, the bounding box for the video object is constantly refreshed, but if there is another object on top of that video object, the zooming universe will recognize that the area of the universe being damaged—i.e., the video object—must be repainted (at the damage rate), and the repainting will be done in the proper order to maintain correct Z-plane ordering for all of the objects in the universe.

Figure 6:
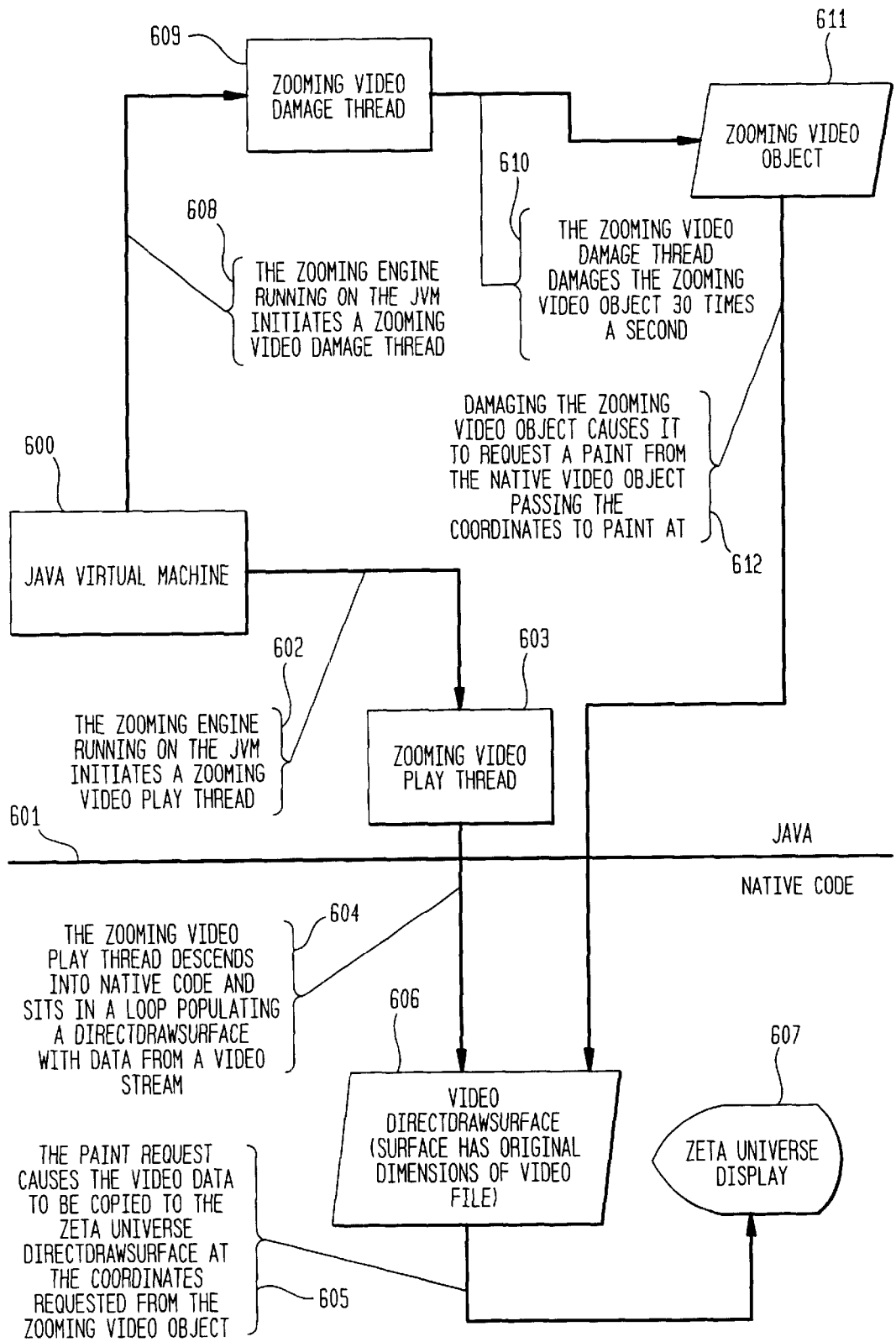
FIG. 6 is a flow chart illustrating the process of the method of the invention.

In FIG. 6, the methodology of the invention is depicted in flow chart form. As can be seen from the figure, that operation is divided, at interface 601, between functions which are carried out in the zooming engine, which is implemented in JAVA, and functions which are carried out in the Native Code for the operating system of the computer. The zooming engine operates under the control of the JAVA Virtual Machine 600 and, as an initial step, the zooming engine initiates a zooming video play thread when the video is instructed to play(step 602), which thread is indicated at block 603. In the next step, that zooming video play thread descends into the native code and sits in a loop populating a DirectDraw surface with data from a video stream running in the native code (step 604). Video frames from that native code DirectDraw surface are copied to a Video DirectDraw surface 606 constituted as a video object in the zooming universe. That Video DirectDraw surface has the original dimensions of native video file. (Note that, for convenience of illustration, this Video DirectDraw surface 606 is shown and the portion of FIG. 6 labeled Native Code, but it should be understood that this surface is contained within an object in JAVA zooming universe.) As the dimensions of the bounding box for that Video DirectDraw surface object are scaled in the zooming universe (from user input), the paint request for that video object causes the video data to be copied to the zooming universe DirectDraw surface at the coordinates requested from the zooming video object (step 605), with the video image at the newly scaled coordinates being displayed at the zooming universe display 607.

FIG. 6 also illustrates an implementation of the additional embodiment previously described whereby an additional object, such as a text object, is overlaid on the zooming video object, and there is no need to refresh the additional object at the refresh rate of the video object. As shown in the figure, an additional thread is initiated by the zooming engine characterized as a Zooming Video Damage Thread (step 608), which video damage thread is depicted in block 609. In order to achieve the heretofore described animation effect as to the video object, the zooming video damage thread damages the zooming video object 30 times per second (for the preferred embodiment) as shown in Stop 610. This damaging of the zooming video object causes it to request a paint from the native video object at each damage occurrence, causing the coordinates of the zoomed video object to be passed to the-paint program for repainting on video DirectDraw surface 606. At that point, just as with the basic methodology of the invention, the paint request causes the video data be copied to the zooming universe DirectDraw surface at the coordinates of the zooming video object (Step 605), and the scaled video is displayed at the Zooming Universe Display 607.

CONCLUSION

A methodology has been described hereinabove for transforming a video file being played in native code of a computer operating system into a zooming universe operating on such computer, where the image of that video file may be scaled by a user to dimensions desired by the user. The zooming engine providing the zooming universe in which the transformed video object may be scaled is preferably implemented in the JAVA programming code. As a further embodiment of the method of the invention, an animation is created by "damaging" the zooming video object at a desired refresh rate to maintain appropriate Z-plane ordering as among the zooming video object and another object, such as text object overlaid on top of the video object.

Although the methodology of the invention, and illustrative applications of that methodology, have been described in detail, it should be understood that various changes, alterations, and substitutions can be made therein without departing from the spirit and scope of the invention as defined by the appended claims.

What is claimed is:

1. A method for providing a desired scaling for images related to a video data stream, said video data stream being arranged as a data file capable of being run on a computer processing device, said method comprising the steps of:

causing an instance of said video data file to be run in a video player library operated on said computer processing device;

providing a zooming engine operable in conjunction with said computer processing device;

causing frames of said video data file running in said video player library to be copied to an object in a zooming universe established by said zooming engine; and scaling said zooming object to a desired level for said video image.

2. The method of claim 1 including an additional step of panning within a plane of said video image.

3. The method of claim 1 wherein said zooming video object is displayed in conjunction with a graphical user interface.

4. The method of claim 3 wherein said desired scaling level is selectable by a user during running of said video file on said computer processing device.

5. The method of claim 4 wherein said user selectable scaling is input via an interactive input device cooperatively linked with said graphical user interface.

6. The method of claim 3 including an additional step of panning within a plane of a video image displayed in said graphical user interface.

7. The method of claim 6 wherein a location panned within said video image is selectable by a user during running of said video file on said computer processing device.

8. The method of claim 7 wherein said user selectable panned location is input via an interactive input device cooperatively linked with said graphical user interface.

9. The method of claim 1 including the further step of causing said frames of said video data file copied to said zooming object to be damaged at a selected repetition rate.

10. The method of claim 1 wherein said zooming engine is implemented in JAVA programming language.

11. In a computer system comprising a processing means, a set of computer instructions constituted as an operating system and a display means for providing a visual display of graphical image data operated on by said processing means, a video imaging means operative to cause video images processed by said processing means to be displayed at a desired level of magnification from a base image size, said video imaging means comprising:

a video player software library operating under said operating system; and a zooming engine means operating in conjunction with said computer system;

wherein a video data stream arranged as a data file is run on said video player software library and frames of said video stream being so run are copied to an object in a zooming universe established by said zooming engine.

12. The computer system of claim 11 further including scaling means for causing said video images to be scaled to a desired level.

13. The computer system of claim 11 further including panning means for panning within a plane of a selected one of said video images.

14. The computer system of claim 11 further including an interactive input means operative to transmit user selection of said desired level of magnification to said video imaging means.

15. The computer system of claim 11 further including means for causing frames of said video stream copied to said zooming object to be damaged at a selected repetition rate.

16. The computer system of claim 11 wherein said zooming engine is implemented in JAVA programming language.

17. A method for providing a desired scaling for images related to a video data stream, said video data stream being arranged as a video data file capable of being run on a computer processing device, said method comprising the steps of:

causing an instance of said video data file to be run in a video player library operated on said computer processing device;

providing a zooming engine operable in conjunction with said computer processing device;

implementing said zooming engine in an object-oriented graphical environment;

causing frames of said video data file running in said video player library to be copied to a zooming object in a zooming universe established by said zooming engine; and scaling said zooming object to a desired level.

18. A computer system comprising:

a processor;

a set of computer instructions constituted as an operating system and a display adapted to provide a visual display of graphical image data operated on by said processor;

a video imaging means operative to cause video images processed by said processor to be displayed at a desired level of magnification from a base image size, said video imaging means including:

a video player software library operating under said operating system; and a zooming engine means operating in conjunction with said operating system that is adapted for use in an object-oriented graphical environment;

wherein a video data stream arranged as a data file is run on said video player software library and frames of said video data stream being so run are copied to an object in a zooming universe established by said zooming engine means.

19. A computer system comprising:

a processor;

a set of computer instructions constituted as an operating system and a display adapted to provide a visual display of graphical image data operated on by said processor;

a video imaging means operative to cause video images processed by said processor to be displayed at a desired level of magnification from a base image size, said video imaging means including:

a video player software library operating under said operating system;

a zooming engine operating in conjunction with said operating system that is adapted for use in an object-oriented graphical environment; and means for causing frames of a video data stream arranged as a data file copied to a zooming object to be damaged at a selected repetition rate;

wherein said video data stream is run on said video player software library and frames of said video data stream being so run are copied to said zooming object in a zooming universe established by said zooming engine.

20. A computer system comprising:

a processor adapted under control of software to provide an object-oriented graphical environment having a plurality of graphical objects;

a video monitor;

a video driver card operatively connected between said video monitor and said processor to reproduce a field of view of said object-oriented graphical environment provided by said video processor to said monitor;

said software including:

a video player library operative to stream frames of video data to one of said graphical objects within said object-oriented graphical environment; and a zooming engine adapted to create a zooming characteristic within said object-oriented graphical environment;

said zooming engine being adapted to scale said field of view of said object-oriented environment according to said zooming engine characteristic.

* * * * *